United States Patent [19]

Locatell, Jr. et al.

[11] 4,452,878

[45] Jun. 5, 1984

[54] QUATERNARY NITROGEN-CONTAINING POLYMERS AND ARTICLES INCLUDING SAME

[75] Inventors: Louis Locatell, Jr., Wellesley Hills; Charles M. Zepp, Berlin, both of Mass.

[73] Assignee: Polaroid Corporation, Cambridge, Mass.

[21] Appl. No.: 492,696

[22] Filed: May 9, 1983

[51] Int. Cl.³ .......................... G03C 1/84; G03C 5/54; G03C 1/40; C08F 26/06

[52] U.S. Cl. .................................... 430/215; 430/221; 430/517; 428/483; 428/500; 428/522; 525/327.1; 525/916; 526/265

[58] Field of Search ............... 430/213, 215, 221, 517, 430/941; 525/916, 327.1; 526/265; 428/500, 522, 483

[56] References Cited

U.S. PATENT DOCUMENTS

| | | | |
|---|---|---|---|
| 3,752,692 | 8/1973 | Young | 430/941 |
| 3,758,445 | 9/1973 | Cohen et al. | 430/213 |
| 3,794.485 | 2/1974 | Bloom et al. | 430/221 |
| 4,312,940 | 1/1982 | Nakamura et al. | 430/213 |
| 4,316,972 | 2/1982 | Petrak | 526/265 |

OTHER PUBLICATIONS

Nour et al., "Pyridinium Compounds . . . Sodium Hydroxide," *J. Chem. Soc.* (c), 1969, pp. 2511-2513.

*Primary Examiner*—Richard L. Schilling

*Attorney, Agent, or Firm*—Louis G. Xiarhos

[57] ABSTRACT

A class of quaternary nitrogen-containing polymeric materials, which upon contact with alkali provide substantial light-absorbing or opacifying properties, is disclosed. The polymeric materials comprise repeating units of the formula:

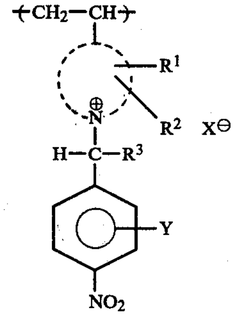

wherein the cyclic quaternary nitrogen-containing moiety is a 2-, 3-, or 4-pyridinium moiety; $R^1$ and $R^2$ are independently hydrogen, alkyl, substituted alkyl, cycloalkyl, aryl, aralkyl, alkaryl, halo, or $R^1$ and $R^2$ together comprise the atoms necessary to complete a six-membered, substituted or unsubstituted benzenoid ring; $R^3$ is hydrogen or alkyl; X is an anion; and Y is hydrogen, alkyl, substituted alkyl, cycloalkyl, aryl, aralkyl, alkaryl or halo.

24 Claims, 3 Drawing Figures

QUATERNARY NITROGEN-CONTAINING POLYMERS AND ARTICLES INCLUDING SAME

BACKGROUND OF THE INVENTION

This invention relates to certain quaternary nitrogen-containing polymeric materials and to articles or products including such polymers. More particularly, it relates to certain transparent (or substantially non light-absorbing) polymeric materials of the aforesaid type adapted upon contact with alkali to the provision of substantial light-absorbing or opacification functionality.

Various patents, including, among others, U.S. Pat. No. 3,752,692 (issued Aug. 14, 1973 to R. W. Young) and U.S. Pat. No. 3,794,485 (issued Feb. 26, 1974 to S. M. Bloom et al.) describe photographic film units which, after being exposed within a camera, are designed to be removed from the camera for processing. Since a photo-sensitive element remains light-sensitive during the processing operation, which typically is effected in an alkaline processing composition, one or more opaque layers will generally be provided in the film unit to afford protection of the photosensitive material against further exposure (fogging) by actinic light. Thus, in the aforesaid U.S. Pat. No. 3,752,692, there is disclosed a film unit including a support having thereon an opaque layer comprising dispersed carbon black. In the aforesaid U.S. Pat. No. 3,794,485, there is described a film unit having a layer of dye precursor material which upon contact with aqueous alkaline processing composition forms a colored species to prevent photoexposure when the film unit is removed from a camera for processing.

It will be appreciated that for certain applications, notably in the production of photographic products, it will be advantageous to provide a layer of transparent (substantially non light-absorbing) polymeric material which can be, as desired, converted to a colored or light-absorbing form capable of providing opacification functionality.

SUMMARY OF THE INVENTION

According to the present invention, there is provided a class of quaternary nitrogen-containing polymeric materials which upon contact with alkali provide substantial light-absorbing or opacifying properties. The polymeric materials comprise repeating units of the formula

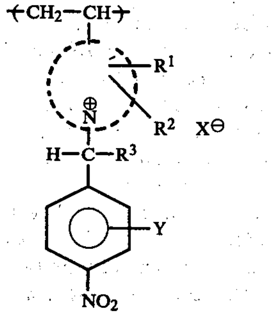

wherein the cyclic quaternary nitrogen-containing moiety is a 2-, 3-, or 4-pyridinium moiety; $R^1$ and $R^2$ are independently hydrogen, alkyl, substituted alkyl, cycloalkyl, aryl, aralkyl, alkaryl, halo, or $R^1$ and $R^2$ together comprise the atoms necessary to complete a six-membered, substituted or unsubstituted benzenoid ring; $R^3$ is hydrogen or alkyl; X is an anion; and Y is hydrogen, alkyl, substituted alkyl, cycloalkyl, aryl, aralkyl, alkaryl or halo.

In one of its article or product aspects, the present invention provides a transparent support material having on one side thereof a transparent and usually colorless polymeric layer which upon contact with alkali is rendered substantially opaque, the transparent polymeric layer comprising recurring units as aforedescribed.

In another of its product aspects, the invention provides a photosensitive material comprising a transparent support having on one side thereof a transparent polymeric layer as aforedescribed and on the opposed side thereof a photosensitive photographic emulsion layer. Upon conversion of the transparent polymeric layer to a light-absorbing layer, protection of the photosensitive emulsion layer against further exposure from the opposed side is provided.

DETAILED DESCRIPTION OF THE INVENTION

Figure 1:
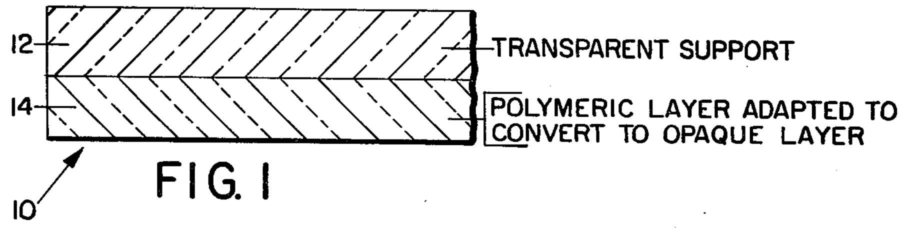
In FIG. 1 is shown a diagrammatic cross-sectional view of an article carrying a layer of polymeric material capable according to the present invention of conversion to an opaque layer.

As indicated above, this invention provides certain quaternary-nitrogen polymers capable upon contact with alkali of conversion from a transparent to a substantially light-absorbing (or opaque) layer. These polymers comprise repeating units according to the formula Formula (I)

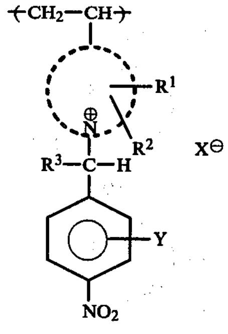

wherein the cyclic quaternary nitrogen-containing moiety is a 2-, 3-, or 4-pyridinium moiety; $R^1$ and $R^2$ are independently hydrogen; alkyl (e.g., methyl, ethyl, propyl, butyl); substituted alkyl (e.g., hydroxyethyl, trifluoromethyl); cycloalkyl (e.g., cyclohexyl); aryl (e.g., tolyl); halo (e.g., chloro, bromo); or $R^1$ and $R^2$ together comprise the atoms necessary to complete with the pyridinium moiety a six-membered, substituted or unsubstituted benzenoid ring (e.g., benzo); Y is hydrogen, alkyl, substituted alkyl, cycloalkyl, aryl, aralkyl, alkaryl or halo (each as exemplified in connection with $R^1$ and $R^2$); $R^3$ is hydrogen or alkyl; and $X^{\ominus}$ is an anion (e.g., chloride, bromide).

As can be appreciated from inspection of Formula (I), and the definitions in connection therewith, the polymeric quaternary nitrogen-containing polymers comprise repeating units having such pyridinium moieties as 2-pyridinium, 3-pyridinium and 4-pyridinium having, respectively, the formulas

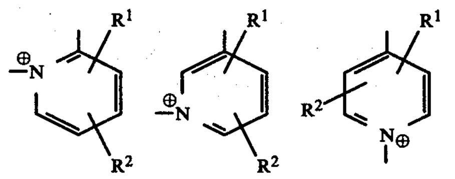

wherein $R^1$ and $R^2$ have the meanings aforesaid. The 4-pyridinium moiety is the pyridinium moiety of choice and provides polymeric materials providing efficient conversion to an opaque layer upon contact with alkali. Preferably, each of $R^1$ and $R^2$ is hydrogen, although substituent groups, as aforedescribed, which do not interfere or otherwise negate the desired functionality of the polymers can be suitably employed.

It will be seen from inspection of Formula (I) that, when $R^1$ and $R^2$ complete a six-membered benzenoid ring, the quaternary nitrogen-containing moiety will be a quinolinium or isoquinolinium moiety as illustrated below

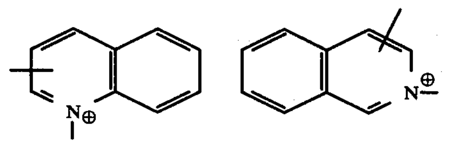

and which is attached through the illustrated valence as a moiety pendant from a polymeric backbone.

Preferred polymers of the invention are polymers comprising repeating units of the formula

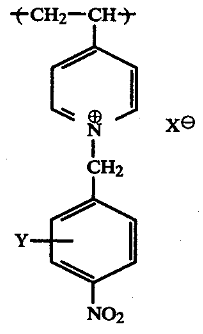

wherein Y has the meaning aforedescribed (preferably, hydrogen) and $X^{\ominus}$ is an anion such as chloride. These polymers are readily converted to opaque materials upon contact with strong alkali and can be readily prepared by resort to synthetic techniques described in detail hereinafter.

The polymers of the present invention can be conveniently prepared by derivatization of a poly(vinylpyridine). Thus, a poly(vinylpyridine) such as poly(4-vinylpyridine), poly(2-vinylpyridine), poly(2-methyl-5-vinylpyridine) or poly(3-vinylpyridine) can be derivatized, i.e., quaternized, by reaction with a p-nitrobenzyl halide of the formula

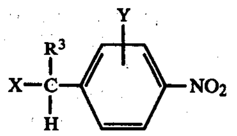

wherein X is halogen (chloro,bromo) and each of $R^3$ and Y has the meaning aforedescribed; preferably each of $R^3$ and Y is hydrogen.

This derivatization is illustrated by the following reaction scheme depicting the reaction of poly(4-vinylpyridine) and p-nitrobenzyl chloride:

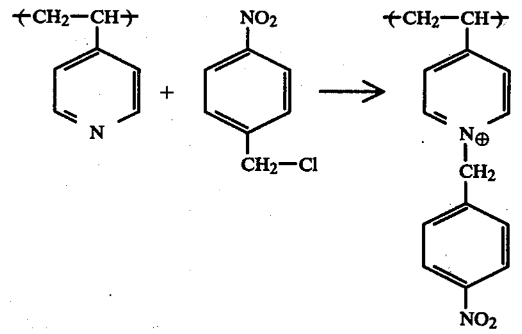

The derivatization reaction can be effected in a suitable solvent for the reactants, i.e., a medium which solubilizes the reactants sufficiently to permit efficient reaction of the particular polymer and derivatizing agent being utilized. Such solvents as diethylene glycol, sulfolane and 2-methoxyethanol can be suitably employed. A preferred solvent is 2-methoxyethanol which readily solubilizes the reactants and permits the facile production of desired polymeric materials.

Suitable derivatization agents for the production of the polymers hereof include p-nitrobenzyl chloride; p-nitrobenzyl bromide; and α-methyl-p-nitrobenzyl chloride. Ring-substituted p-nitrobenzyl compounds can also be utilized provided that the substituents do not adversely interfere with the desired derivatization reaction and do not adversely affect the capacity of the resulting polymers to undergo a conversion (upon contact with alkali) from a substantially transparent polymeric layer to a substantially opaque layer. Suitable ring-substituted derivatizing agents include, for example, o-chloro-p-nitrobenzyl chloride.

While the polymers hereof are described by particular reference to a derivatization of a poly(vinylpyridine), it will be appreciated that, if desired, a derivatization of a monomeric vinylpyridine (using a derivatizing agent as herein described) can be performed; and the resulting derivatized monomeric vinylpyridine can be polymerized to the desired polymer of the invention. Such a polymerization can be effected by resort to known polymerization technique. For example, the derivatized vinylpyridine monomer can be polymerized with the aid of a peroxide catalyst, e.g., benzoyl peroxide.

The amount of the p-nitrobenzyl derivatizing agent utilized to derivatize a polymer of a vinylpyridine can vary with the amount of opacification functionality desirably introduced into the polymer. Thus, the derivatization can be effected such that the mole percent of repeating units corresponding to Formula (I) amounts, for example, to about 10% to 100%, the difference from 100% (0 to about 90%) comprising nonderivatized pyridine moieties.

The degree of derivatization can be varied consistent with the provision of a polymer having physical properties adapted to a particular utilization. Thus, where a polymer having brittleness is desirably avoided, derivatization should, in general, be employed such that the Formula (I) repeating units comprise up to about 35 mole % of the copolymer. It will be appreciated that such polymer properties as solubility, swellability, permeability to alkali and coatability can be controlled by the degree of derivatization and the nature and amount of other repeating units as may be present in the polymers of the invention.

Preferred copolymers of the invention include the following repeating units

Formula (II)

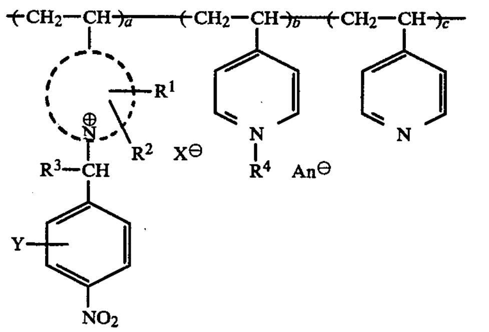

wherein the quaternary nitrogen-containing moiety and $R^1$, $R^2$, $R^3$, X and Y of the "a" units have the meanings aforedescribed; $R^4$ is alkyl (e.g., methyl, ethyl) or substituted alkyl (e.g., carboxymethyl or $—CH_2—CH_2—CH_2—CH_2—SO_3$); An represents an anion (e.g., methylsulfate, ethylsulfate, tosylate, bromide); and a, b and c represent molar percentages of the respective recurring units.

Repeating units of the "b" type permit control of certain desired polymer solubility and swellability properties and can be provided in the polymer by derivatization using a compound $R^4$—An wherein $R^4$ and An have the aforedescribed meanings. Such compounds as dimethyl sulfate, diethyl sulfate, methyl tosylate and bromoacetic acid can be employed.

In the Formula (II) polymers, the mole % of the "a" repeating units will preferably range from about 25 to about 50; the mole % of "b" units will preferably range from about 5% to about 75%; and the mole % of "c" units will be the balance to 100% and, preferably, in the range of from 0 to about 75%. An especially preferred copolymer which combines desired permeability to alkali and efficient conversion from a transparent to an opaque layer is a polymer conforming to Formula (II) wherein the a:b:c mole ratios are 33:15:52.

The polymers of the invention exhibit efficient opacification capability in converting from a substantially transparent polymeric layer to a highly colored (light-absorbing) layer. The polymers can be converted to highly colored material by contact with concentrated alkali such as sodium hydroxide, potassium hydroxide or the like. In general, a concentration of about 0.5 to about 2 molar will be suitable to effect the conversion. A preferred concentration is in the range of from about 0.8 to about 1.5 moles. It will be appreciated that the particular concentration of alkali required to effect the conversion will vary with the desired and predetermined rate of conversion and the particular polymer employed.

Photographic aqueous alkaline processing compositions customarily utilized in diffusion transfer photographic processing can conveniently be utilized to effect the desired conversion. These compositions are known and, in general, will have a pH in the range of about 13.5 or more. Thus, a transparent support material carrying a layer of a polymer of the invention can be utilized in a photographic product or process as a support material through which a photosensitive emulsion can be photoexposed, and upon application of a photographic processing composition typically used in the conduct of such a process, the polymeric layer can be rapidly converted to a highly colored form to provide protection against further photoexposure from the direction of such support material.

Figure 2:
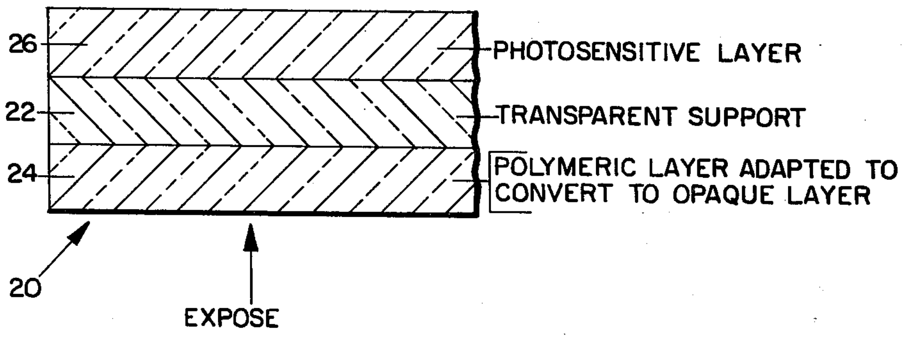
In FIG. 2 is shown a diagrammatic cross-sectional view of an article such as is shown in FIG. 1, additionally including a photosensitive layer.

Referring to FIG. 1, there is shown a diagrammatic cross-sectional representation of an article 10 of the invention comprising a transparent support 12 carrying a transparent layer 14 of the quaternary nitrogen-containing polymer of the present invention. Article 10 can, for example, be employed for the production of any of a number of photographic products and processes where, as shown in photosensitive element 20 of FIG. 2, actinic light is transmitted through a transparent layer 24 of a polymer of the present invention and through a transparent support 22 to photoexpose a photosensitive layer 26 such as a silver halide emulsion layer. After photoexposure, photosensitive element 20 can be contacted with an alkaline solution such that polymeric layer 24 thereof is converted to a highly colored (opaque) layer. This highly colored layer permits photosensitive element 20 to be removed from a camera to conditions of ambient light and provides protection of photosensitive layer 26 against further exposure (fogging) from the exposure direction. It will be appreciated that means for protecting photosensitive layer 26 against further exposure from the opposed direction upon removal of photosensitive element 20 to conditions of ambient light can be provided by an opaque layer (not shown) such as a cover sheet positioned over photosensitive layer 26.

Figure 3:
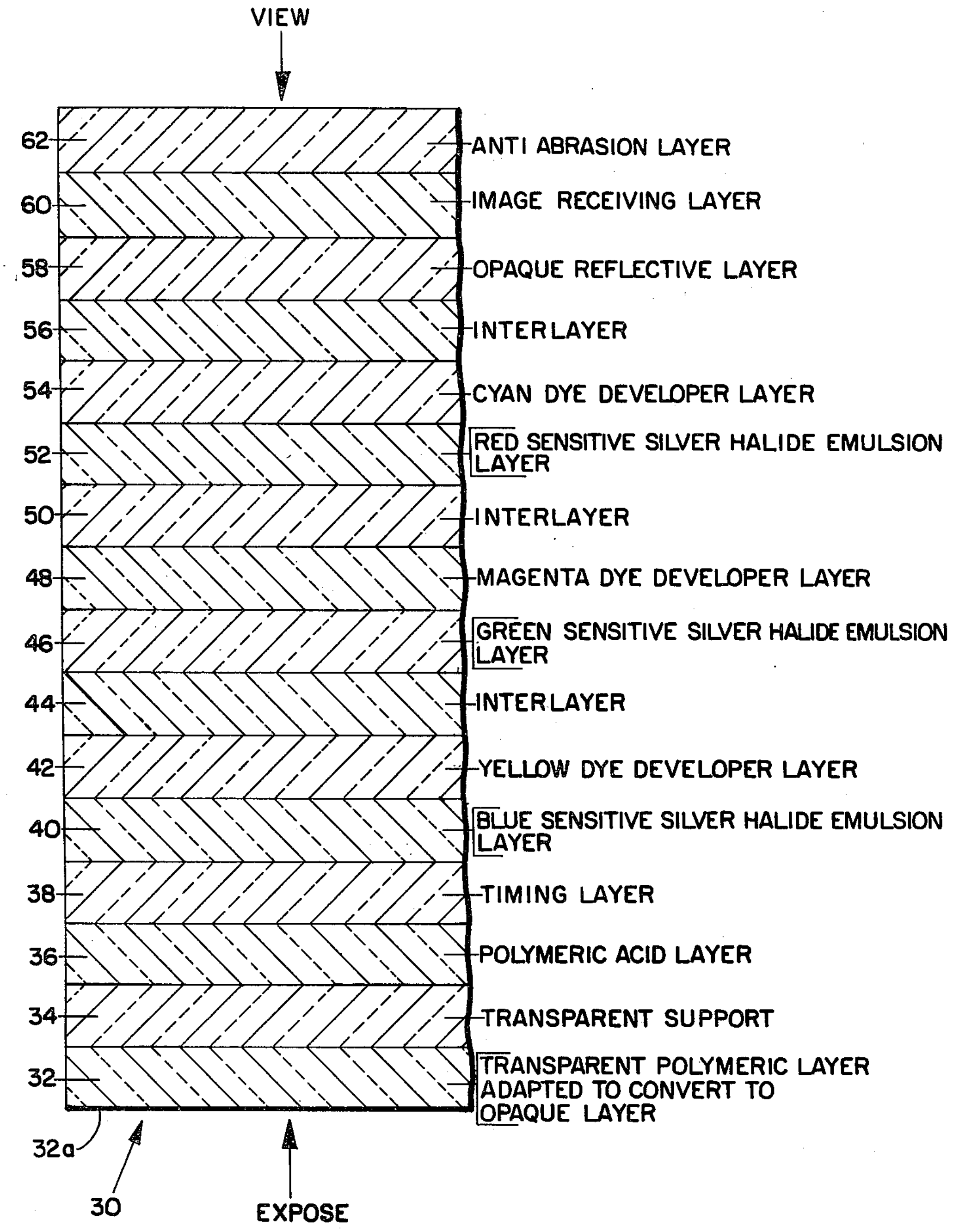
In FIG. 3 is shown a diagrammatic cross-sectional view of a photographic film unit illustrating an arrangement of layers adapted to the provision of a photographic image by diffusion transfer processing.

In FIG. 3, is shown a preferred embodiment of the present invention in the form of a photographic diffusion transfer film unit, including as a layer thereof a layer of a polymer of the present invention adapted upon contact with alkali to be converted from a transparent layer to a substantially opaque layer. It will be appreciated that other arrangements of layers can also be utilized to provide a photographic film unit including a polymeric quaternary nitrogen-containing layer of the present invention.

In diffusion transfer embodiments of this invention, the diffusible image-providing substance may be a complete dye or a dye intermediate, e.g., a color coupler. The preferred embodiments of this invention use a dye developer, that is, a compound which is both a silver halide developing agent and a dye disclosed in U.S. Pat. No. 2,983,606, issued May 9, 1961 to Howard G. Rogers. As is now well known, the dye developer is immobilized or precipitated in developed areas as a consequence of the development of the latent image. In unexposed and partially exposed areas of the emulsion, the dye developer is unreacted and diffusible and thus provides an imagewise distribution of unoxidized dye developer, diffusible in the processing composition, as a function of the point-to-point degree of exposure of the silver halide emulsion. At least part of this imagewise distribution of unoxidized dye developer is transferred, by imbibition, to the superposed image-receiving layer to provide a reversed or positive color image of the developed image. The image-receiving layer contains a mordant to mordant transferred unoxidized dye developer.

Dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group.

Multicolor images may be obtained using the color image-forming components, for example, dye developers, in an integral multi-layer photosensitive element. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion stratum, for example in the form of particles, or it may be disposed in a stratum (e.g., of gelatin) behind the appropriate silver halide emulsion stratum. Each set of silver halide emulsion and associated dye developer strata preferably are separated from other sets by suitable interlayers. In certain instances, it may be desirable to incorporate a yellow filter in front of the green-sensitive emulsion and such yellow filter may be incorporated in an interlayer. However, if the yellow dye developer has the appropriate spectral characteristics and is present in a state capable of functioning as a yellow filter, a separate yellow filter may be omitted.

For convenience, further description of this invention will be in the context of the use of dye developers and positive transfer images.

Referring to FIG. 3, film unit 30 comprises a transparent support 34 carrying on a first side thereof a layer 32 of quaternary nitrogen-containing polymer of the invention. On the opposed side of support layer 34 is shown a polymeric acid-reacting layer 36, timing layer 38, a blue-sensitive silver halide emulsion layer 40, a yellow dye developer layer 42, an interlayer 44, a green-sensitive silver halide emulsion layer 46, a magenta dye developer layer 48, an interlayer 50, a red-sensitive silver halide emulsion layer 52, a cyan dye developer layer 54, an interlayer 56, an opaque/reflective layer 58 (which preferably contains a white igment such as titanium dioxide to provide a white background against which the image is viewed, and an opacification agent such as carbon black), an image-receiving layer 60 and an anti-abrasion layer 62.

Photoexposure of the silver halide emulsion layers is effected through the transparent quaternary nitrogen-containing polymeric layer 32 and through transparent support 34 and the layers carried thereon, i.e., the polymeric acid layer 36 and the spacer or timing layer 38, which layers are also transparent, the film unit being so positioned within the camera that light admitted through the camera exposure or lens system is incident upon the outer or exposure surface 32*a* of the polymeric layer 32 of the present invention.

After photoexposure, the film unit is immersed in an aqueous alkaline processing composition. After a suitable imbibition period, e.g., in the range of about 40 to 120 seconds, the transparent polymeric layer 32 is converted by the alkaline processing to a highly colored (opaque) layer. In addition, development of emulsion layers 40, 46 and 52 is initiated by contact with the processing composition. If the film unit is removed from the processing composition to conditions of ambient light, the still photosensitive and developing emulsion layers thereof are protected against additional photoexposure by ambient or environmental light through transparent support 34 by the now opaque layer 32. The emulsion layers are protected against additional photoexposure from the opposed (or image-viewing) side of the film unit by opaque reflective layer 58.

In exposed and developed areas, the dye developers are oxidized as a function of the silver halide development and are immobilized. Unoxidized dye developer associated with undeveloped and partially developed areas remains mobile and is transferred imagewise to the image-receiving layer 60 to provide the desired positive image therein.

Permeation of the alkaline processing composition through the several layers of the film unit is controlled so that the process pH is maintained at a high enough level to effect the requisite development and image transfer and to convert the polymeric layer 32 to a highly colored form, after which, pH reduction is effected as a result of alkali permeation into the polymeric acid layer 36 such that the pH is reduced to a level which stops further dye transfer. Layer 32, after having been rendered opaque by the action of alkali, remains opaque notwithstanding this pH reduction. The image in dye developer present in the image-bearing layer 60 is viewed through the anti-abrasion layer 62 and transparent support 60 against the reflecting layer 58 which provides an essentially white background for the dye image and also effectively masks from view the developed silver halide emulsion layer and dye developer immobilized therein or remaining in the dye developer layers.

In the embodiment illustrated in FIG. 3, image-receiving layer 60 (and reflecting layer 58 against which the image is viewed) are shown as layers of the unitary element 30. While this is a particularly useful and preferred embodiment, image formation can be accomplished in a separate image-receiving element comprising a transparent or opaque (e.g., baryta) support and an image-receiving layer. The image-receiving element may be brought into superposed relation with a photosensitive element comprising layers 32 through 58, either before or after photoexposure thereof. Polymeric layer 32 can be rendered opaque and development can be initiated by contact with an aqueous alkaline processing composition. The image-receiving element can be left intact for viewing through the transparent support thereof a reflection print against reflective layer 58. Alternatively, the image-receiving element can be separated for the viewing of a transparency or reflection print, respectively, in the case of a transparent or opaque (e.g., baryta) image-receiving element support.

According to another embodiment, transparent polymeric layer 32 can, if desired, be positioned between transparent support 34 and polymeric acid layer 36. It will be appreciated, however, that owing to the amount of time required for alkali to permeate the several layers of the film unit so as to permit conversion of transparent layer 32 to an opaque layer, the positioning as shown in FIG. 3 will be preferred. As indicated hereinbefore, other arrangements of layers can be suitably employed to provide photographic images by diffusion transfer products and processes utilizing a quaternary nitrogen-containing substantially transparent polymeric layer of the invention.

Film units which include a layer adapted to conversion to a substantially opaque layer and which are adapted to utilization of a quaternary nitrogen-containing polymer hereof are described in the application of J. G. Bullitt et al., U.S. Ser. No. 492, 732, filed of even date.

As indicated previously, the polymers of the present invention are converted to a highly colored (light-absorbing) material upon contact with alkali. The highly colored material is usually observed to be black or a nearly-black dark brown. While applicants do not wish to be bound by any precise theory or explanation of the mechanism by which this conversion is effected, it is believed that cleavage and condensation reactions are involved. It is believed that a base-activated cleavage reaction is involved such that there is provided a poly(vinylpyridine) product and certain highly colored products of undetermined constitution. These undetermined products are believed to result from condensation reactions which may be bimolecular condensations. Although the nature of these mechanistic changes is not completely known or understood, the conversion of a layer of a polymer of the present invention from a transparent to an opaque layer permits the polymers to be utilized in numerous applications where such properties are advantageously utilized.

The present invention is illustrated in greater detail in the following examples which are intended to be illustrative only and not limitative.

EXAMPLE I

This example illustrates the preparation of a polymer of the present invention, according to the following reaction scheme wherein indicated amounts of the repeating units thereof are in mole percent:

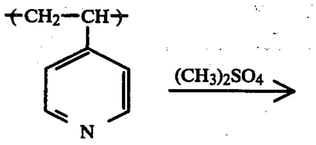

-continued

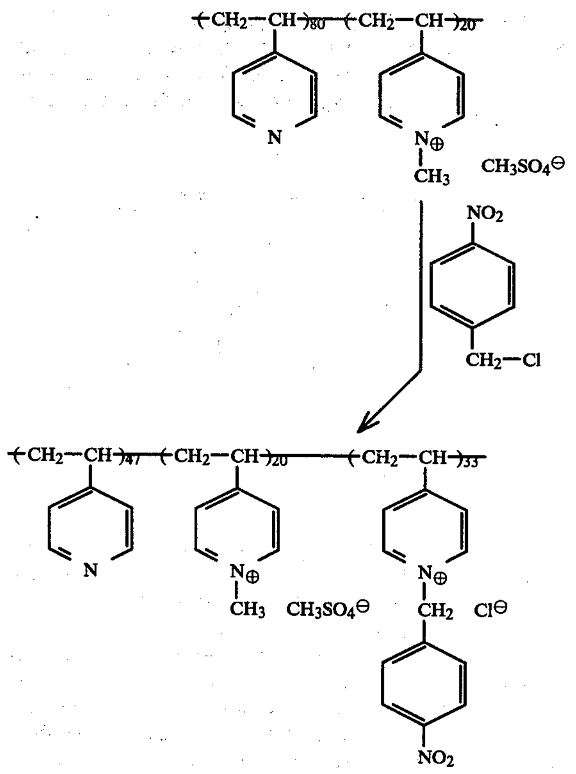

To a two-liter, three-necked flask, equipped with a paddle stirrer, were added 1000 mls. of 2-methoxyethanol. As the solvent was being stirred, 126 gms. (1.20 mole) of poly(4-vinylpyridine) were added. This mixture was slowly brought to gentle reflux by use of a heating mantle during which time the polymer dissolved. The heat was turned off and 30.2 gms. (0.24 mole) of dimethyl sulfate were dripped in at a rate that caused the mixture to reflux gently. After the addition of the dimethyl sulfate was complete, heating was resumed and the solution was refluxed for thirty minutes. Solid p-nitrobenzyl chloride (68.6 gms.; 0.4 mole) was added and refluxing was continued until the reaction was complete. The progress of the reaction was followed by quenching aliquots of the reaction solution into diethyl ether and using thin layer chromatography to monitor the consumption of the p-nitrobenzyl chloride (K5f plates, 25% diethyl ether/petroleum ether). The reaction is usually complete in one hour. After cooling to room temperature, the polymer solution was precipitated into five liters of ethyl acetate with vigorous agitation. The solid was allowed to settle and the ethyl acetate removed by decantation. Another two liters of ethyl acetate were added, the mixture stirred a few minutes and then filtered by suction. The filter cake was washed with ethyl acetate and sucked as dry as possible under a rubber dam (this takes at least one hour). After air drying for an additional two hours, the polymer was dried in a vacuum over at 50° C. for five hours.

The product exhibited solubility in aqueous dilute acid (2% acetic acid). Molecular structure was confirmed by C13 nuclear magnetic resonance.

EXAMPLE 2

This example illustrates the preparation of the following polymer of the invention by reaction of poly(4-vinylpyridine) with p-nitrobenzyl chloride and by the reaction of the resulting product with dimethyl sulfate:

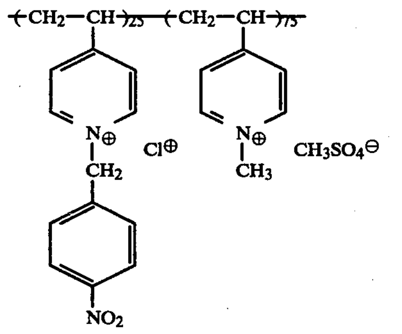

In a three-necked, 500-ml. flask placed on a steam bath, 10.5 gms. (0.1 mole) of poly(4-vinylpyridine) were dissolved with stirring in 100 mls. of 2-methoxyethanol. To the solution, were added 4.3 gms. (0.025 mole) of p-nitrobenzyl chloride and the resulting solution was stirred with heating for 1.5 hours. The solution was cooled slightly and 12.6 gms. (0.1 mole) of dimethyl sulfate were added. Heating was continued for one-half hour. The solution was cooled, diluted with 200 mls. of methanol and poured with stirring into one liter of tetrahydrofuran (THF). The resulting granular solid was isolated by filtration, washed well with THF and ether and was dried.

EXAMPLES 3 TO 16

Using the procedures generally described in Examples 1 and 2 above, appropriate substitution of derivatizing reactants were made for the production of polymers corresponding to the following formula and described more particularly in Table I:

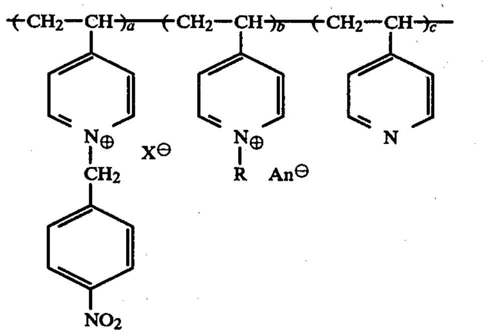

R, $X^{\ominus}$ and $An^{\ominus}$ are defined in Table I; reported values for a, b and c are in mole percent.

TABLE I

| Example | $X^{\ominus}$ | R | $An^{\ominus}$ | a:b:c |
|---|---|---|---|---|
| 3 | $Cl^{\ominus}$ | — | — | 25:0:75 |
| 4 | " | — | — | 50:0:50 |
| 5 | " | methyl | $CH_3SO_4^{\ominus}$ | 25:25:50 |
| 6 | " | " | " | 30:25:45 |
| 7 | " | ethyl | $C_2H_5SO_4^{\ominus}$ | 25:25:50 |
| 8 | $Br^{\ominus}$ | methyl | $CH_3SO_4^{\ominus}$ | 25:25:50 |
| 9 | $Cl^{\ominus}$ | " | " | 25:5:70 |

TABLE I-continued

| Example | $X^{\ominus}$ | R | $An^{\ominus}$ | a:b:c |
|---|---|---|---|---|
| 10 | " | — | — | 37.5:0:62.5 |
| 11 | " | methyl | $CH_3SO_4^{\ominus}$ | 25:10:65 |
| 12 | " | " | " | 50:18:32 |
| 13 | " | " | tosylate | 30:50:20 |
| 14 | " | $-(CH_2)_4-SO_3^{\ominus}$ | — | 25:25:50 |
| 15 | " | $-CH_2-COOH$ | $Br^{\ominus}$ | 33:20:47 |
| 16 | " | methyl | $CH_3-SO_4^{\ominus}$ | 33:15:52 |

EXAMPLES 17 TO 21

Elements of the present invention (Elements 17 to 21) comprising in each instance a transparent sheet support and a transparent polymeric layer adapted to conversion to an opaque layer upon contact with alkali were prepared in the following manner.

In each instance a coating composition was prepared having the following composition:

| Ingredients | Parts by Weight |
|---|---|
| Polymer of the Invention* | 27 |
| Glacial acetic acid | 2 |
| Nonionic surfactant (nonyl-phenoxy polyglycidyl ether) | 0.1 to 0.2 |
| Water | Balance to 100 |

*identified in Table II hereinafter

In each instance the coating composition was applied to a transparent subbed polyethylene terephthalate support sheet in an amount to provide a dry weight coverage of about 20 gms./m.[2] of the polymer. The coated elements were dried by impingement of air. Prior to conversion of the polymeric layer of each element to an opaque layer, each element was evaluated for its substantially colorless character by measurement of red, green and blue transmission density using a MacBeth densitometer. Each element was thereafter contacted with alkali for purposes of effecting conversion of the polymeric layer thereof to an opaque layer. This was accomplished by immersing each element for 90 seconds in an alkaline bath having the following composition:

| Ingredients | Parts by Weight |
|---|---|
| Potassium hydroxide | 5 |
| Zinc acetate dihydrate | 0.74 |
| Tetramethyl reductic acid | 0.20 |
| N—(n-pentyl)-α-picolinium bromide | 2.2 |
| Water | 91.86 |

Each element, upon removal from the alkaline bath, was squeegeed for removal of excess bath fluid and the opaque character thereof was evaluated by measurement of transmission density. Results of transmission density measurements for each element (before and after treatment in the alkaline bath) are reported in Table II as follows:

TABLE II

| | | Transmission Density | | | | | |
|---|---|---|---|---|---|---|---|
| | Polymer of | Before Treatment | | | After Treatment | | |
| Element | Example | R | G | B | R | G | B |
| 17 | 1 | 0.02 | 0.04 | 0.09 | 3.4 | >4 | >4 |
| 18 | 6 | 0.04 | 0.04 | 0.08 | 3.8 | 5 | 6 |
| 19 | 11 | 0.02 | 0.03 | 0.06 | 1.95 | 3.25 | 3.95 |
| 20 | 15 | 0.01 | 0.06 | 0.17 | 2.5 | >4 | >4 |

TABLE II-continued

| | | Transmission Density | | | | | |
|---|---|---|---|---|---|---|---|
| | Polymer of | Before Treatment | | | After Treatment | | |
| Element | Example | R | G | B | R | G | B |
| 21 | 16 | 0.02 | 0.05 | 0.09 | 3.0 | >4 | >4 |

From inspection of the data appearing in Table II, it will be seen that the Elements thereof were substantially colorless and transparent prior to treatment with alkali and that the polymeric layer of each element was converted to a highly absorbing layer upon the alkaline treatment thereof.

EXAMPLE 22

An element (Element 22) of the present invention comprising a transparent support and having a polymeric acid-reacting layer on one side thereof and a layer of polymer of the present invention on the opposed side, was prepared in the following manner. A seven-mil (0.18 mm.) polyethylene terephthalate transparent subbed support (containing a minor amount of carbon black for protection against light-piping and halation effects) was provided on one side thereof with a polymeric acid layer (coated at a coverage of about 10,000 mgs./m.$^2$) comprising approximately 8.5 parts of a half butyl ester of polyethylene/maleic anhydride copolymer and one part of polyvinyl butyral. On the opposed side of the transparent support was coated a layer of the polymer of Example 3 (coated to a coverage of about 34,800 mgs./m.$^2$ of the polymer) by applying thereto a coating composition having the following formulation:

| Ingredients | Parts by Weight |
|---|---|
| Polymer of Example 3 | 17.4 |
| Deionized gelatin | 2.6 |
| Glacial acetic acid | 2.5 |
| Nonionic surfactant (nonyl-phenoxy polyglycidyl ether) | 0.2 |
| Water | 77.3 |

The element was air dried and was evaluated by measurement of transmission densities before and after treatment in an alkaline bath (using a bath of the same formulation as described in Examples 17 to 21). Results of transmission density are reported as follows in Table IV:

TABLE IV

| | | Transmission Density | | | | | |
|---|---|---|---|---|---|---|---|
| | Polymer of | Before Treatment | | | After Treatment | | |
| Element | Example | R | G | B | R | G | B |
| 22 | 3 | 0.02 | 0.05 | 0.11 | 1.74 | 3.32 | 4.61 |

EXAMPLE 23

An element (Element 23) of the present invention comprising a transparent support and having a polymeric acid-reacting layer on one side thereof and a layer of polymer of the present invention on the opposed side, was prepared in the following manner. A seven-mil (0.18 mm.) polyethylene terephthalate transparent subbed support (containing a minor amount of carbon black for protection against light-piping and halation effects) was provided on one side thereof with a polymeric acid layer (coated at a coverage of about 10,000 mgs./m.$^2$) comprising approximately 8.5 parts of a half butyl ester of polyethylene/maleic anhydride copolymer and one part of polyvinyl butyral. On the opposed side of the transparent support was coated a layer of the polymer of Example 16 (coated to a coverage of about 20,000 mgs./m.$^2$ of the polymer) by applying thereto a coating composition having the following formulation:

| Ingredients | Parts by Weight |
|---|---|
| Polymer of Example 16 | 25 |
| $KCr(SO_4)_2 \cdot 12H_2O$ | 0.25 |
| Glacial acetic acid | 2 |
| Nonionic surfactant (nonyl-phenoxy polyglycidyl ether) | 0.2 |
| Water | 72.55 |

The element was air dried and was evaluated by measurement of transmission densities before and after treatment in an alkaline bath (using a bath of the same formulation as described in Examples 17 to 21). The element was evaluated at each of two imbibition times (90 seconds and 120 seconds). Results of transmission density are reported as follows in Table IV:

TABLE IV

| | | Transmission Density | | | | | |
|---|---|---|---|---|---|---|---|
| | Polymer of | Before Treatment | | | After Treatment | | |
| Element | Example | R | G | B | R | G | B |
| | | | | | 90 secs. | | |
| 23 | 16 | 0.01 | 0.03 | 0.06 | 3.30 | 4.90 | 5.30 |
| | | | | | 120 secs. | | |
| | | | | | 3.59 | 5.10 | 5.50 |

EXAMPLE 24

An element as described in Example 23 was utilized for the production of a photographic diffusion transfer film unit. The film unit was prepared by coating in succession, over the polymeric acid layer of the element, the following layers (such that the film unit had the structure shown in FIG. 3):

1. as a timing layer, coated at a coverage of about 2500 mgs./m.$^2$, a 39/39/1.5/0.5/20 pentapolymer of diacetone acrylamide, butyl acrylate, acrylic acid, 2-acrylamido-2-methylpropane sulfonic acid and 2-cyanoethyl acrylate;

2. a blue-sensitive silver iodobromide emulsion layer coated at a coverage of about 1300 mgs./m.$^2$ of silver (1.11 microns) and about 650 mgs./m.$^2$ of gelatin;

3. a yellow dye developer layer made up of about 1150 mgs./m.$^2$ of the following yellow dye developer

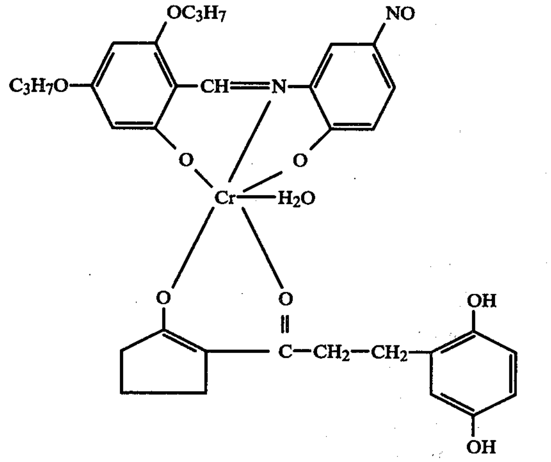

about 566 mgs./m.$^2$ of gelatin; about 45 mgs./m.$^2$ of 4-(1-phenyl 1,2,3,4-tetrazolyl-5-thiomethyl)-imidazole; and about 115 mgs./m.$^2$ of 4'-methyl phenyl hydroquinone;

4. as an interlayer, a matrix system comprising 70 parts of a 50.5/44/5/0.5 matrix copolymer of diacetone acrylamide/butyl acrylate/acrylic acid/2-acrylamido-2-methylpropane sulfonic acid and polymerized therein 30 parts of a 72/28 copolymer of 2-cyanoethyl acrylate/diacetone acrylamide, the matrix system coated at a coverage of about 2000 mgs./m.$^2$ and about 17 mgs./m.$^2$ of succindialdehyde;

5. a green-sensitive silver iodobromide emulsion layer coated at a coverage of about 896 mgs./m.$^2$ of silver (1.11 microns) and about 394 mgs./m.$^2$ of gelatin;

6. a magenta dye developer layer made up of about 500 mgs./m.$^2$ of the following magenta dye developer

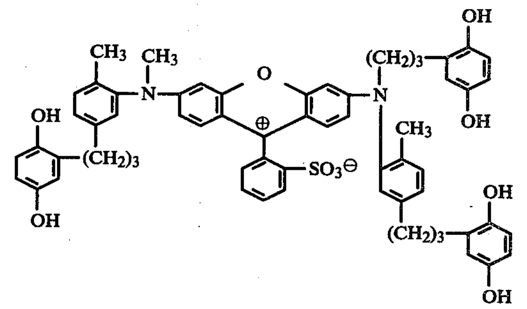

about 321 mgs./m.$^2$ of gelatin; about 30.5 mgs./m.$^2$ of 4-(1-phenyl 1,2,3,4-tetrazolyl-5-thiomethyl)-imidazole; and about 115 mgs./m.$^2$ of 4'-methyl phenyl hydroquinone;

7. an interlayer comprising the matrix system of layer 4 at a coverage of about 1500 mgs./m.$^2$ and about 13 mgs./m.$^2$ of succindialdehyde;

8. a red-sensitive silver iodobromide emulsion layer coated at a coverage of about 866 mgs./m.$^2$ of silver (1.11 microns) and about 520 mgs./m.$^2$ of gelatin;

9. a cyan dye developer layer made up of about 350 mgs./m.$^2$ of the following cyan dye developer

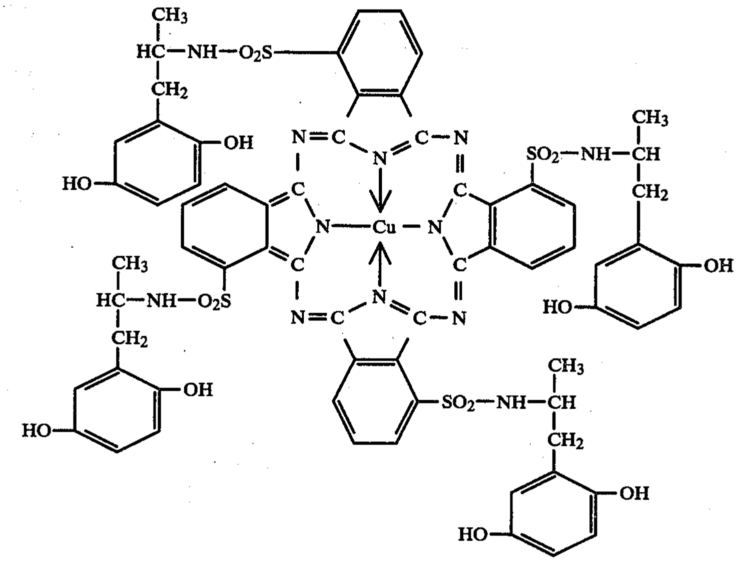

about 266 mgs./m.$^2$ of gelatin, about 30.5 mgs./m.$^2$ of 4-(1-phenyl 1,2,3,4-tetrazolyl-5-thiomethyl)-imidazole; about 100 mgs./m.$^2$ of 4'-methyl phenyl hydroquinone;

10. as an interlayer, a matrix system comprising 70 parts of a 49/42.5/8/0.5 matrix copolymer of diacetone acrylamide/butyl acrylate/acrylic acid/2-acrylamido-2-methylpropane sulfonic acid and polymerized therein 30 parts of a 72/28 copolymer of 2-cyanoethyl acrylate/diacetone acrylamide, the matrix system coated at a coverage of about 2000 mgs./m.$^2$;

11. an opacification layer made up of about 1500 mgs./m.$^2$ of carbon black and about 422 mgs./m.$^2$ of polyethylene oxide;

12. a reflective layer made up of about 11000 mgs./m.$^2$ of titanium dioxide, about 1467 mgs./m.$^2$ of polyethylene oxide, about 917 mgs./m.$^2$ of Rhoplex HA-12 polyacrylamide latex (Rohm & Haas) and about 1467 mgs./m.$^2$ of teflon (duPont teflon 30);

13. an image-receiving layer coated at a coverage of about 2000 mgs./m.$^2$ of a graft copolymer comprised of 4-vinyl pyridine (4VP) and vinyl benzyl trimethylammonium chloride (TMQ) grafted onto hydroxyethyl cellulose (HEC) at a ratio HEC/4VP/TMQ of 2.2/2.2/1; and 14. a topcoat layer made up of about 4000 mgs./m.$^2$ of sodium cellulose sulfate and about 58 mgs./m.$^2$ of polyacrylamide.

The photographic film unit was photoexposed (two meter-candle-seconds) to a test target, or step wedge, through the transparent polymeric layer 32 and transparent support 34 thereof. The film unit was then processed in a bath of alkaline photographic processing composition by introducing the photoexposed film unit into a light-tight chamber containing the photographic processing composition (having the composition recited in Examples 17 to 21) at room temperature (22° C.) After an imbibition period of two minutes, the film unit was removed from the bath through a pair of rollers (to remove excess fluid) and into ambient light. Layer 32 was dark brown to black in appearance, the highly colored (absorbing) nature of the layer being indicative of opacification functionality. Red, green and blue Dmax and Dmin values were measured and are reported in the following Table IV:

TABLE IV

| Dmin | | | Dmax | | |
|---|---|---|---|---|---|
| R | G | B | R | G | B |
| 0.17 | 0.20 | 0.24 | 1.60 | 2.40 | 2.22 |

An additional sample of the film unit prepared as described in the Example was photoexposed and processed in the same manner, except that, ten seconds after removal from the two-minute processing bath, the film unit was illuminated for two minutes with a tungsten lamp at 1000 foot-candles. Layer 32 was observed to be dark brown to black in appearance, the highly colored (absorbing) nature of the layer being indicative of opacification functionality. The image showed only a barely noticeable level of fogging notwithstanding the aforedescribed tungsten lamp illumination. The following Dmin and Dmax values were recorded, as shown in Table V.

TABLE V

| Dmin | | | Dmax | | |
|---|---|---|---|---|---|
| R | G | B | R | G | B |
| 0.17 | 0.19 | 0.22 | 1.59 | 2.41 | 2.39 |

What is claimed is:

1. A quaternary nitrogen-containing polymer comprising repeating units of the formula:

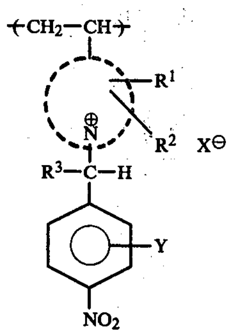

wherein the cyclic quaternary nitrogen-containing moiety is a 2-, 3-, or 4-pyridinium moiety; $R^1$ and $R^2$ are independently hydrogen, alkyl, substituted alkyl, cycloalkyl, aryl, aralkyl, alkaryl, halo, or $R^1$ and $R^2$ together comprise the atoms necessary to complete a six-membered, substituted or unsubstituted benzenoid ring; $R^3$ is hydrogen or alkyl; X is an anion; and Y is hydrogen, alkyl, substituted alkyl, cycloalkyl, aryl, aralkyl, alkaryl or halo.

2. The quaternary nitrogen-containing polymer of claim 1 wherein each of $R^1$, $R^2$, $R^3$ and Y is hydrogen.

3. The quaternary nitrogen-containing polymer of claim 2 wherein said cyclic quaternary nitrogen-containing moiety is a 4-pyridinium moiety.

4. The quaternary nitrogen-containing polymer of claim 3 wherein the $X^{\ominus}$ anion is a halide ion.

5. The quaternary nitrogen-containing polymer of claim 1 comprising repeating units of the formula

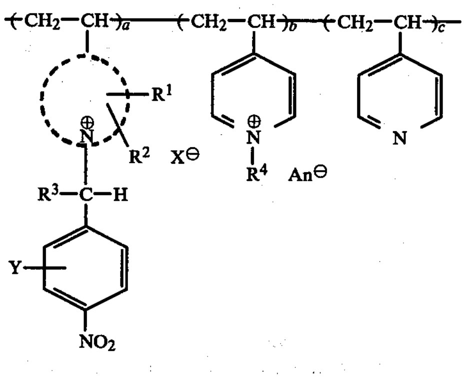

wherein $R^4$ is alkyl or substituted alkyl; $An^{\ominus}$ represents an anion; and a, b and c represent molar percentages of the respective repeating units where a is in the range of from about 25 to about 50, b is in the range of from about 5 to about 75 and c is the balance to 100.

6. The quaternary nitrogen-containing polymer of claim 5 wherein a represents about 33 mole percent, b represents about 15 mole percent and c represents about 52%.

7. A transparent article comprising a transparent support having on one side thereof a transparent layer of a quaternary nitrogen-containing polymer adapted upon contact with alkali to conversion to a substantially opaque layer, said quaternary nitrogen-containing polymer comprising repeating units of the formula

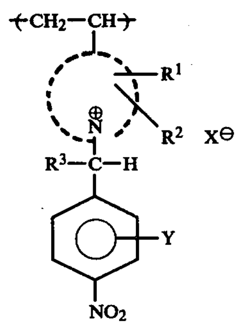

wherein the cyclic quaternary nitrogen-containing moiety is a 2-, 3-, or 4-pyridinium moiety; $R^1$ and $R^2$ are independently hydrogen, alkyl, substituted alkyl, cycloalkyl, aryl, aralkyl, alkaryl, halo, or $R^1$ and $R^2$ together comprise the atoms necessary to complete a six-membered, substituted or unsubstituted benzenoid ring; X is an anion; $R^3$ is hydrogen or alkyl; and Y is hydrogen, alkyl, substituted alkyl, cycloalkyl, aryl, aralkyl, alkaryl or halo.

8. The article of claim 7 wherein each of $R^1$, $R^2$, $R^3$ and Y in said quaternary nitrogen-containing polymer is hydrogen.

9. The article of claim 8 wherein said cyclic quaternary nitrogen-containing moiety is a 4-pyridinium moiety.

10. The article of claim 9 the $X^{\ominus}$ anion is a halide ion.

11. The article of claim 1 wherein the quaternary nitrogen-containing polymer comprises repeating units of the formula

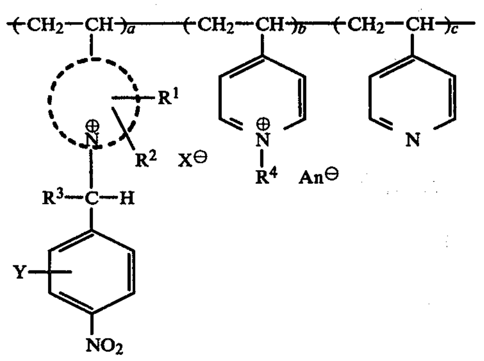

wherein $R^4$ is alkyl or substituted alkyl; $An^{\ominus}$ represents an anion; and a, b and c represent molar percentages of the respective repeating units where a is in the range of from about 25 to about 50, b is in the range of from about 5 to about 75 and c is the balance to 100.

12. The article of claim 11 wherein a represents about 33 mole percent, b represents about 15 mole percent and c represents about 52 mole percent.

13. The article of claim 8 wherein said transparent support is a polyethylene terephthalate support.

14. The article of claim 8 wherein, on the side of said support opposed to said layer of quaternary nitrogen-containing polymer, is present a layer of polymeric acid.

15. A photosensitive article comprising a transparent support having on one side thereof a transparent layer of a quaternary nitrogen-containing polymer adapted upon contact with alkali to conversion to a substantially opaque layer, and on the opposed side thereof a photosensitive photographic emulsion system comprising at least one photosensitive layer, said quaternary nitrogen-containing polymer comprising repeating units of the formula

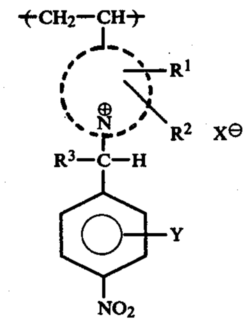

wherein the cyclic quaternary nitrogen-containing moiety is a 2-, 3-, or 4-pyridinium moiety; $R^1$ and $R^2$ are independently hydrogen, alkyl, substituted alkyl, cycloalkyl, aryl, aralkyl, alkaryl, halo, or $R^1$ and $R^2$ together comprise the atoms necessary to complete a six-membered, substituted or unsubstituted benzenoid ring; X is an anion; $R^3$ is hydrogen or alkyl; and Y is hydrogen, alkyl, substituted alkyl, cycloalkyl, aryl, aralkyl, alkaryl or halo.

16. The photosensitive article of claim 15 wherein each of $R^1$, $R^2$, $R^3$ and Y in said quaternary nitrogen-containing polymer is hydrogen.

17. The photosensitive article of claim 16 wherein said cyclic quaternary nitrogen-containing moiety is a 4-pyridinium moiety.

18. The photosensitive article of claim 17 wherein the $X^{\ominus}$ anion is a halide ion.

19. The photosensitive article of claim 15 comprising repeating units of the formula

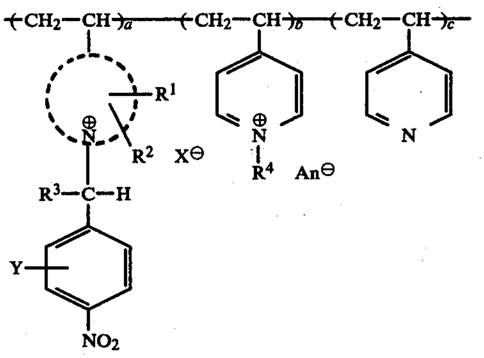

wherein $R^4$ is alkyl or substituted alkyl; $An^{\ominus}$ represents an anion; and a, b and c represent molar percentages of the respective repeating units where a is the range of from about 25 to about 50, b is in the range of from about 5 to about 75 and c is the balance to 100.

20. The photosensitive article of claim 19 wherein a represents about 33 mole percent, b represents about 15 mole percent and c represents about 52 mole percent.

21. The photosensitive article of claim 15 wherein said transparent support is a polyethylene terephthalate support.

22. The photosensitive article of claim 15 wherein said photosensitive system comprises a blue-sensitive silver halide emulsion layer, a green-sensitive silver halide emulsion layer and a red-sensitive silver halide emulsion layer, each said emulsion layer being in association, respectively, with a yellow dye developer, a magenta dye developer layer and a cyan dye developer.

23. The photosensitive article of claim 22 including on the side of said support opposed from said layer of quaternary nitrogen-containing polymer, an image-receiving layer.

24. The photosensitive article of claim 23 including, on the side of said support opposed from said layer of quaternary nitrogen-containing polymer, a reflective layer adapted to the viewing thereagainst of a photographic image in said image-receiving layer.

* * * * *